May 13, 1941.    W. C. BRADEN    2,241,536
TRANSMISSION
Filed July 29, 1938    3 Sheets-Sheet 1

INVENTOR
William C. Braden
BY Kenyon & Kenyon
ATTORNEYS

May 13, 1941.  W. C. BRADEN  2,241,536
TRANSMISSION
Filed July 29, 1938  3 Sheets-Sheet 2

INVENTOR
William C. Braden
BY
Kenyon & Kenyon
ATTORNEYS

May 13, 1941.　　　W. C. BRADEN　　　2,241,536
TRANSMISSION
Filed July 29, 1938　　　3 Sheets-Sheet 3
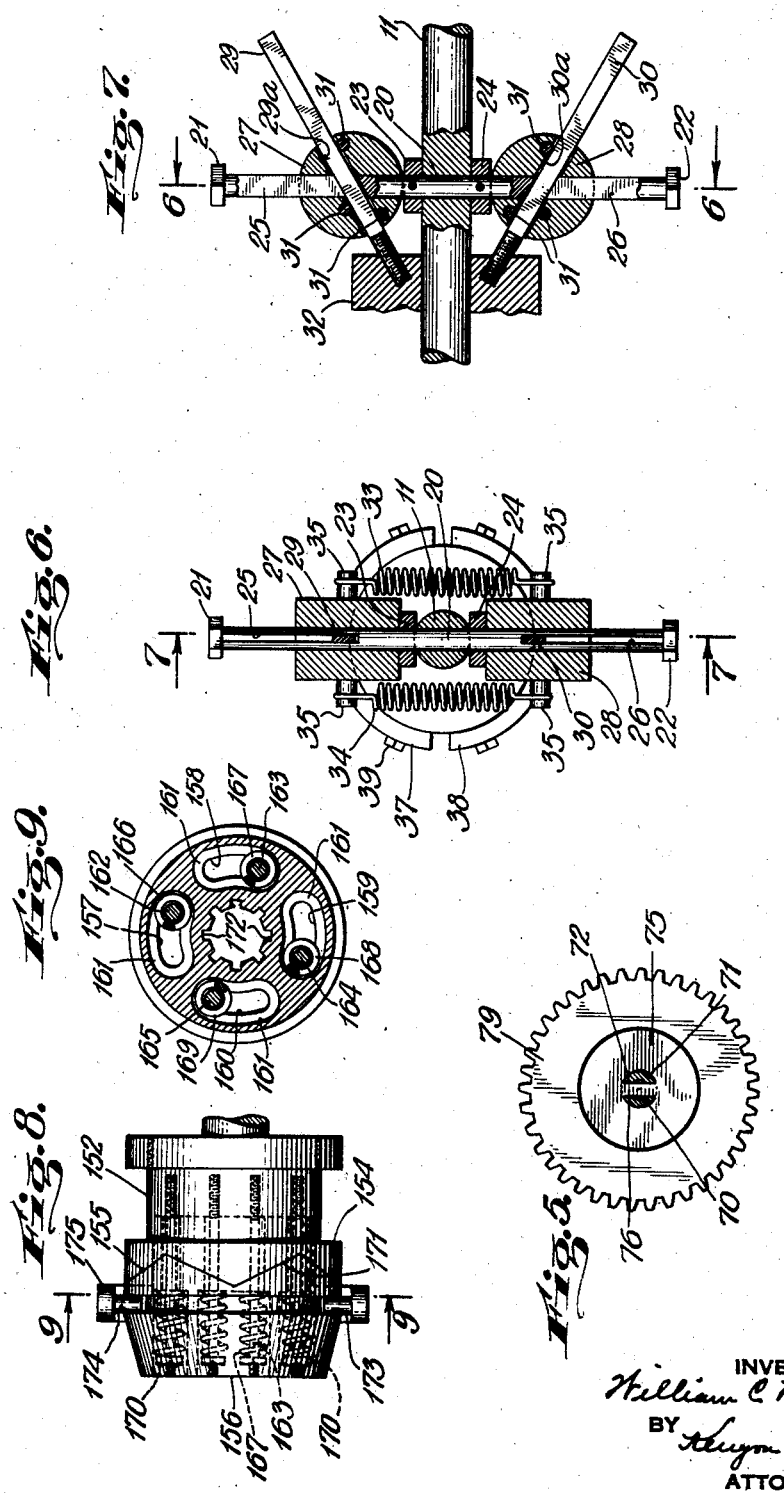
INVENTOR
William C. Braden
BY
Kenyon & Kenyon
ATTORNEYS Patented May 13, 1941

2,241,536

UNITED STATES PATENT OFFICE 2,241,536

TRANSMISSION

William C. Braden, Brooklyn, N. Y., assignor of one-half to Thomas S. Pates, Brooklyn, N. Y.

Application July 29, 1938, Serial No. 221,942

20 Claims. (Cl. 74—336)

This invention relates to a variable speed transmission adapted for use between a driving and a driven shaft, and more especially for use on an automobile, truck or other vehicle whose source of power is an internal combustion engine.

In general the transmission which is the subject of the present invention is of that class wherein the gears for transmitting power at reduced speed between the driving and driven shafts are in constant mesh or engagement, and a plurality of clutches are provided of which one or another may be brought into engagement at a given instant to transmit power between the driving and driven shafts through one or another of the gear trains which provide for such transmission upon a speed reduction basis, or for transmission of power between said shafts without speed reduction. The invention in one aspect relates to the means or instrumentalities, and their mode of operation, by which the said clutches are successively actuated in response either to variations of the speed of rotation of the driving shaft or according to a response thereto which is modified by the load upon the driven shaft or which may be locked in any ratio by a manually selective lever.

One of the objects of this invention lies in the provision of automatic means whereby, while the driving shaft is rotating at a speed equivalent to that of an idling internal combustion motor, no power is transmitted to the driven shaft but upon increase of the speed of rotation of the driving shaft above the speed specified, a clutch is automatically and gradually brought into engagement which permits power to be transmitted from the driving shaft to the driven shaft through a constant-mesh train of gears corresponding in ratio to what is known as "low gear" in well-known types of automobile construction, and as the speed of rotation of the driving shaft increases still further the said first-mentioned clutch is quickly released and a second clutch is automatically and gradually brought into engagement to transmit power through another constant-mesh train of gears having a ratio corresponding to "intermediate gear," and as the speed of rotation of the driving shaft is still further increased said second-mentioned clutch is quickly released and a third clutch is automatically brought into engagement directly interconnecting the driving and driven shafts for the transmission of power therebetween without speed reduction, and corresponding to direct or "high gear" as is well understood in automobile practise.

A further object of this invention lies in the provision of manual controlled means whereby the predetermined speed of the driving shaft at which any one of said clutches is automatically brought into engagement may be increased at will during operation so as to prevent or delay bringing said clutch into engagement until said driving shaft has attained a higher speed of rotation than said predetermined speed. This feature of the invention is particularly useful in the case of the application of this invention to an automobile, when it is desired to keep the car in "low gear" during acceleration to a speed higher than that at which normally the shift would be made to "intermediate gear"—for example, when accelerating on a long hill or operating under equivalent heavy and continued load.

A further object of this invention lies in the provision of means automatically responsive to increase of load to be overcome and effective upon the mechanism which controls the actuation of the clutches to modify the action of the automatic means previously mentioned so as to bring into engagement, or to maintain in engagement, that clutch which brings about transmission of power at a higher gear ratio until said load has been overcome. This feature is particularly useful when the transmission of this invention is applied to an automobile, because it provides for automatic postponement of the shift from, for example, "low gear" to "intermediate gear" when increase of load upon the driven shaft calls for increased effort from the motor, and permits the automobile to remain in "low gear" while the speed of the motor increases above that speed at which, in normal operation, the shift from "low gear" to "intermediate gear" would take place.

A further advantage of this mechanism resides in the manner in which the clutch control mechanism actuates the clutches, in that the said clutches, when about to be actuated, are brought into engagement gradually and automatically so as to prevent "grabbing" and thereafter, when engagement of said clutch is to be released, the said release is effected substantially instantaneously and without delay. In this way the mode in which a trained and careful automobile driver operates his clutch pedal is automatically simulated by the mechanism here described.

As to certain features, this application is a continuation in part of my prior application Ser. No. 113,129 filed November 28, 1936.

Referring to the annexed drawings wherein like reference characters indicate like parts:

Figure 5 is a vertical section on the line 5, 5 of Figure 1.

Figure 6 is a vertical section on the line 6, 6 of Figure 1.

Figure 7 is a vertical section on the line 7, 7 of Figure 6.

Figure 8 is a horizontal plan view, with the bearing removed, on the line 8, 8 of Figure 1.

Figure 9 is a vertical section on the line 9, 9 of Figure 8.

Referring to these drawings—

Figure 1:
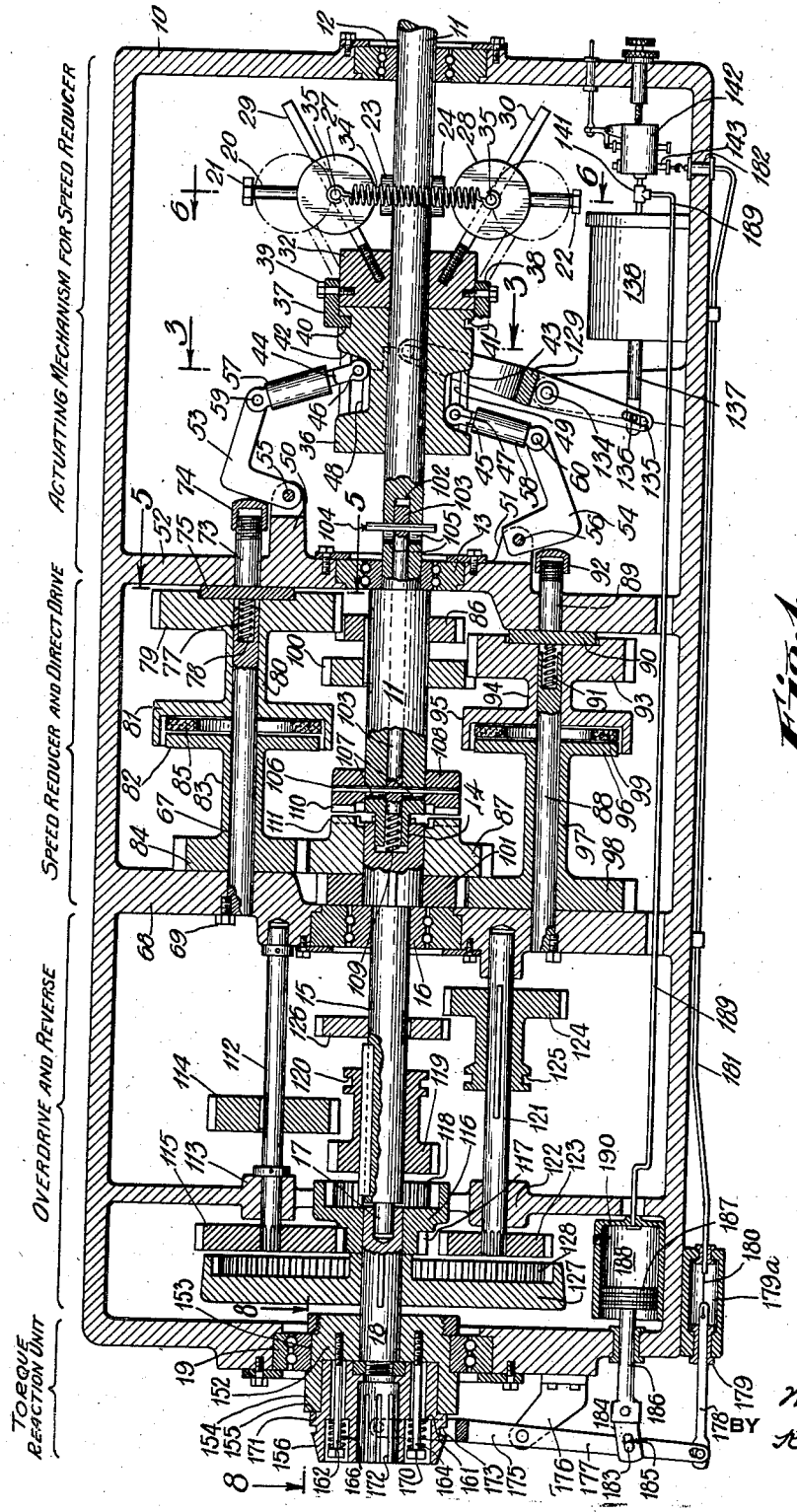
Figure 1 is a vertical section along its central axis of one form of transmission according to this invention, certain parts of the shafts and the oil valve mechanism 142 and parts associated therewith being shown in elevation for convenience. The legends appearing above the said figure are for convenience only and are not intended to vary the written description of the mechanism which follows.

Within a casing 10 is journaled a driving shaft 11 supported upon two bearings 12, 13. Reduced end portion 14 of shaft 11 is rotatably journaled within a step bearing in the end of a second shaft 15 supported in a bearing 16 and having, at its opposite end, a reduced end portion 17 journaled within a step bearing in the end of a third shaft 18 journaled within a bearing 19 secured to casing 10.

Fixed within a diametrical bore in shaft 11 is a cross pin 20 (see Figs. 1, 6 and 7) having nuts 21, 22 in screw-threaded engagement therewith near each end thereof. Collars 23, 24 are in engagement with the cross pin 20 on each side of the shaft 11 and are suitably fastened to the cross pin 20 to secure the same in position. At either side of the shaft 11 longitudinal slots 25, 26 extend from side to side of the cross pin 20 (Fig. 6).

Slidably mounted upon cross pin 20 are two weight members 27, 28 which are adapted to move upon the cross pin 20 within limits defined respectively by the collars 23, 24 and by the nuts 21, 22, said motion being at right angles to the axis of rotation of shaft 11. Weights 27, 28 have a vertical drilling which engages the cross pin 20. Two coil springs 33, 34 interconnect the weight members 27, 28 and engage pins 35 fixed thereto. The arrangement is such that increase in the speed of rotation of driving shaft 11 causes weights 27, 28 to move outwardly under the influence of centrifugal force, and decrease in the speed of rotation of said shaft causes said weights to move inwardly toward the axis of shaft 11 under the influence of springs 33 and 34. Preferably the strength of springs 33, 34 is such that weights 27, 28 are retained against collars 23, 24 until the speed of rotation of driving shaft 11 exceeds that speed which is customarily known as the "idling" speed of an internal combustion motor.

Weights 27, 28, in addition, are pierced by rectangular slots 29a, 30a (see Fig. 7) which lie in a plane which also contains the axes of shaft 11 and of the cross pin 20 and form, with the axis of shaft 11, an angle of about 30°, more or less. Diagonal bars 29, 30 pass through the longitudinal slots 25, 26 of the cross pin 20 and through the rectangular slots 29a, 30a of the weight members, respectively. Rollers 31 positioned within weights 27, 28 and partly projecting into the rectangular slots 29a, 30a provide rolling points of contact between diagonal bars 29, 30 and weights 27, 28 respectively.

Slidably mounted upon shaft 11 is a collar 32 (see Fig. 1). Diagonal bars 29, 30 are screw-threadedly engaged within openings in said collar 32 in such manner that the diagonal bars are securely affixed thereto. The arrangement of the weight members 27, 28, the diagonal bars 29, 30, and the collar 32 are such that as the weights 27, 28 move outwardly from the axis of shaft 11 (riding upon cross pin 20 as a guide) the angular relation between diagonal bars 29, 30 and the direction of movement of the weights is such as to cause diagonal bars 29, 30 to be moved to the left as seen in the several figures of the drawings and thus to move collar 32 to the left.

Loosely mounted on driving shaft 11 is an actuating member 36 which, as hereinafter described, is secured against rotation with the driving shaft 11 but is free to slide in a direction parallel to the axis thereof within a predetermined path of movement. Two annular half-collars 37, 38 are secured to the collar 32 by screws 39. Said annular half-collars have inturned flanges 40 engaging within a circumferential slot 41 in the periphery of actuating member 36 near that end thereof which is adjacent to the collar 32. The arrangement is such that rotation of collar 32 with driving shaft 11 will not be imparted to actuating member 36, but rectilinear motion of collar 32 in a direction parallel to the axis of driving shaft 11 will be transmitted to actuating member 36 so that the latter and collar 32 will be moved together longitudinally of shaft 11.

Actuating member 36 is shaped, in its upper and lower periphery, to provide longitudinal slots 42 and 43 therein (see Figs. 1 and 3) for engagement with the ends of the plungers 44, 45. The ends of said plungers 44, 45 are secured in said slots by cross pins 46, 47, said pins passing through eyes at the ends of the plungers 44, 45 and being engaged within pin slots 48, 49 in the side walls of the slots 42, 43. Longitudinal slots 42, 43 are of such length as to provide a limited path of movement, relative to actuating member 36, for the pins 46, 47 on which are engaged the eyes at the ends of plungers 44, 45, for a purpose hereinafter stated. Furthermore, slot 42 is displaced longitudinally of the actuating member 36 from slot 43 to an extent required for the purpose hereinafter described, and as shown in Figure 1.

Mounted upon brackets 50, 51 secured upon transverse dividing wall 52 of the casing 10 are pivotally mounted two bell crank levers 53, 54, the pins 55, 56 serving as the pivotal connections between said bell crank levers and said brackets respectively. Pins 55 and 56 are offset from one another in respect to their relation to the axis of driving shaft 11, in an amount equal to the degree of offset of the slots 42, 43 previously mentioned. Pivotally secured at the opposite ends of bell crank levers 53, 54, respectively, are annular spring housings 57, 58. The pins 59, 60 secured near said ends of bell crank levers 53, 54, respectively, serve as a common pivotal connection between such bell crank levers and the annular spring housings respectively. Pins 59 and 60 are offset from one another with respect to their vertically projected position upon the axis of shaft 11 to an amount equal to the displacement of pins 55, 56 and of slots 42, 43.

Figure 4:
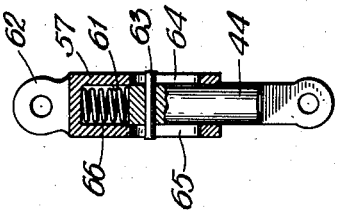
Figure 4 is a substantially vertical section of one of the plungers and its associated spring housing which is shown in elevation in Figure 1.

Annular spring housings 57, 58 are similar, and a description of one will suffice for both (see Fig. 4). The annular spring housing 57 is provided with a longitudinal bore 61 and has an open and a closed end. Adjacent to the closed end is provided an eye 62 for engagement with the pin 59. The plunger 44, previously mentioned, is slidably positioned within the bore 61. A cross pin 63 passes through the plunger 44 at right angles to the axis thereof and the opposite ends of pin 63 engage respectively within longitudinal slots 64, 65 formed in the annular wall of spring housing 57. Thus the length of slots 64, 65 determines the limit of motion of plunger 44 within bore 61. A coiled compression on spring 66 is positioned within bore 61 in engagement with the end of plunger 44 and tends to move the same outwardly from within the bore 61.

The arrangement is such that as actuating member 36 moves to the left, as seen in Figure 1, in response to outward movements of weights 27, 28 away from the axis of shaft 11, the righthand end (as seen in Fig. 1) of slot 42 engages the lower end of plunger 44 and moves it to the left, thereby moving said plunger and its associated spring housing 57 toward a vertical position and thereby rotating bell crank lever 53 about its fixed pivot 55 in a counter-clockwise direction until plunger 44 has reached its "dead center" position. Further movement of actuating member 36 to the left moves plunger 44 beyond its "dead center" position and under the influence of spring 66 the lower end of plunger 44 moves rapidly toward the opposite end of slot 42 with a "snap action," thereby causing bell crank lever 53 to move rapidly in a clockwise direction and thus to return it to its initial position as it appears in Figure 1. At about the time of the occurrence of this "snap action" in the plunger 44, the actuating member 36 has moved far enough to the left so that the head of plunger 45 makes engagement with the righthand end of slot 43 and is moved thereby to the left (as seen in Fig. 1). Continued movement of actuating member 36 to the left causes plunger 45 to move toward its "dead center" position thereby rotating bell crank lever 54 in a clockwise direction about its pivot 56. Further movement of actuating member 36 to the left causes plunger 45 to pass its "dead center" position and a similar "snap action" occurs causing the head of plunger 45 to move to the left in slot 43, under the influence of the spring within spring housing 58 and thus to cause bell crank lever 54 to move about its pivot 56 in a counter-clockwise direction. Thus, movement of actuating member 36 from the initial position of rest shown in Figure 1 toward the left, as seen in that figure, successively moves bell crank levers 53 and 54 from their initial positions of rest, as seen in Figure 1, to a deflected position, and bell crank lever 53 is returned from its deflected position by a sudden "snap action" before bell crank lever 54 has reached its deflected position.

A fixed side shaft 67 is mounted to extend between transverse dividing wall 52 and transverse dividing wall 68 of the casing 10. Shaft 67 is removably secured against rotation by means of screw 69. The end of shaft 67 which penetrates wall 52 is divided into two segments 70, 71 (see Fig. 5) providing an intermediate slot 72. Slidably mounted within slot 72 is a plunger 73 (see Fig. 1) having an adjustable screw-threaded cap 74 mounted upon the end thereof and adapted to be moved endwise by bell crank lever 53 when the latter is deflected from its initial position of rest by the mechanism hereinabove described. A washer 75 having a bridge 76 (see Fig. 5) across its central opening is loosely fitted upon the divided end of shaft 67 so that the bridge 76 thereof engages within slot 72. Plunger 73 is adapted to engage against bridge 76 and thus to move washer 75 from its initial position to rest, as shown in Figure 1, towards the left. Within a longitudinal bore 77 in shaft 67 is positioned a coiled compression spring 78. Said spring is adapted to engage the opposite side of bridge 76 and to oppose movement of said bridge and of washer 75 towards the left as seen in Figure 1.

Revolvably mounted upon fixed shaft 67 is a gear wheel 79 integral with an annular hub 80 which in turn is integral with shell clutch member 81. The unit comprising gear wheel 79, hub 80 and shell clutch member 81 is free to revolve upon fixed shaft 67 and also to move axially therealong. Such axial movement is produced by reason of the engagement of washer 75 with gear wheel 79, and the arrangement is such that movement of washer 75 to the left, as seen in Figure 1, in response to corresponding movement of the mechanism previously described, moves gear wheel 79, hub 80 and shell clutch member 81 to the left as seen in said figure.

Revolvably mounted upon fixed shaft 67 is a disk clutch member 82 formed integral with a hub 83 and a gear wheel 84. The unit comprising disk clutch member 82, hub 83 and gear wheel 84 is free to revolve as a unit upon fixed shaft 67, but is secured against axial or longitudinal movement therealong. Between shell clutch member 81 and disk clutch member 82 is positioned an annular ring of suitable friction material 85 adapted to be tightly engaged between the two clutch members and to provide means of transmitting power therebetween.

A gear wheel 86 is secured upon, and for rotation with, driving shaft 11, and the teeth thereof are at all times in engagement with the teeth of gear wheel 79. A gear wheel 87 is secured upon, and for rotation with, shaft 15, and the teeth of gear wheel 87 are at all times in engagement with the teeth of gear wheel 84.

The relation of the parts just described is such that when clutch members 81, 82 are brought into frictional engagement with the annular ring of frictional material 85 between them, so that power is transmitted through this clutch, power will then be transmitted from driving shaft 11 through gear wheels 86 and 79, through the clutch 81, 85, 82, and through gear wheels 84, 87 to the shaft 15. Preferably, the relationship of the sizes of the several gear wheels in the train just described is such as to transmit power from shaft 11 to shaft 15 upon a speed reduction basis corresponding to "low gear" in the standard automobile. The engagement of the teeth of gear wheel 86 and gear wheel 79 is such as to permit the required small longitudinal movement of the latter incidental to actuation of the clutch without disengaging the said teeth.

A second fixed side shaft 88 is secured between walls 52 and 68 in a manner substantially identical with that of fixed side shaft 67. Fixed shaft 88 is in all respects similarly shaped, having a divided end within wall 52, a plunger 89, loose washer 90, spring 91 and an adjustable screw-threaded cap 92 upon the plunger 89. The construction and manner of operation of these parts correspond to the construction and manner of operation of the similar parts already described. Upon fixed shaft 88 is mounted a unit comprising gear wheel 93, hub 94 and shell clutch member 95, the said unit being free to revolve upon fixed shaft 88 and likewise free to move longitudinally thereof within a small path of movement in a similar manner to the corresponding unit upon fixed shaft 67 previously described. Upon shaft 88 is likewise mounted a unit comprising disk clutch member 96, hub 97 and gear wheel 98 similar to the corresponding unit previously described. Between the clutch members 95, 96 is positioned an annular ring of suitable frictional material 99 similar to the ring 85 previously described. Gear wheel 100 secured upon, and for rotation with, shaft 11 is in toothed engagement with gear wheel 93, and gear wheel 101 secured upon, and for rotation with, shaft 15 is in toothed engagement with gear wheel 98.

Engagement of gear wheel 93 with gear wheel 100 is such as to permit the small required longitudinal movement of gear wheel 93 along its shaft 88 without disengagement of the teeth of gear wheel 93 from the teeth of gear wheel 100.

The train of gears and the clutch associated with fixed shaft 88 are similar in all respects to the train of gears and clutch associated with fixed shaft 67, except for a difference in sizes of the respective gear wheels. The gear wheels associated with fixed shaft 88 are so related in size as to transmit power between shaft 11 and shaft 15 upon a different ratio of speed reduction from that of the gear wheels associated with fixed shaft 67. Preferably the ratio of speed reduction of gear wheels associated with fixed shaft 88 correspond to so-called "intermediate gear" in the standard automobile.

Thus there is provided two separate and distinct sets or trains of gear wheels in constant-mesh, but whether power is transmitted through the one train or the other depends upon which of the clutches is brought into engagement.

The lefthand end of shaft 11 (as seen in Fig. 1) is axially drilled for a portion of its length to provide the longitudinal bore 102. Slidably positioned within said bore is a floating shaft 103 adapted for limited movement in a path parallel to the axis of shaft 11. A cross pin 104 is secured within a diametrical drilling in floating shaft 103 and the ends thereof project outwardly through slots 105 in driving shaft 11 and project beyond the periphery of shaft 11 to an extent sufficient to enable actuating member 36, as it approaches the limit of its path of movement, as seen in Figure 1, to engage pin 104 and thus move said pin and shaft 103 to the left as seen in said figure. Slots 105 are of sufficient length to permit this movement to the required extent. Near its opposite (or left) end a second cross pin 106 is secured within a diametrical drilling of floating shaft 103 and each of its ends projects outwardly through slots 107 in shaft 11. The opposite ends of pin 106, each projecting outwardly beyond the periphery of shaft 11, are secured to a crown wheel 108 slidably mounted upon shaft 11 and free to be moved longitudinally thereof in accordance with movement of pin 106 and the floating shaft 103. A coiled compression spring 109 bears against the end of floating shaft 103 and against the end of shaft 15 within the step bearing and opposes by its compression movement of floating shaft 103 to the left, as seen in Figure 1. Crown wheel 108 has teeth 110 formed in one face thereof and said teeth are adapted, under certain conditions hereinafter described, to engage teeth 111 formed in a shoulder of the gear wheel 87 fixed upon shaft 15, thus forming a toothed clutch.

The arrangement of the parts just described is such that movement of floating shaft 103 to the left, as seen in Figure 1, causes crown wheel 108 to move to the left and thus to bring teeth 110 and 111 into engagement, thereby transmitting power between shaft 11 and shaft 15 on a "direct" basis without speed reduction.

In order, if desired, to provide an "overdrive"—i. e., means for causing power to be transmitted between the driving and driven shafts upon a speed-increase basis so that the driven shaft revolves at greater speed than the driving shaft—the folowing mechanism may be employed. Upon a revolvable side shaft 112, suitably journaled in the wall 68 and in a fixed journal bearing 113, is secured for rotation therewith a gear wheel 114. Upon the end of shaft 112 is secured for rotation therewith a second gear wheel 115. Upon the end of shaft 18 is secured for rotation therewith a gear wheel 116 having external teeth 117 and internal teeth 118. The teeth of gear wheel 115 are in constant-mesh with the external teeth 117 of gear wheel 116. Upon shaft 15 is slidably mounted a gear wheel 119 whose extended hub portion has formed therein a circumferential groove 120. Gear wheel 119 and its extended hub are keyed upon shaft 15 in such manner as to be slidable therealong and to rotate therewith. Manual movement of gear wheel 119 in one direction brings the teeth thereof into engagement with the internal teeth 118 of gear wheel 116; manual movement of gear wheel 119 in the opposite direction brings the teeth thereof into engagement with the teeth of gear wheel 114. A manually controlled yoke or other equivalent actuating member (not shown) engaged within the circumferential slot 120 enables the same to be moved to make either of the said engagements, or to be maintained in "neutral" position intermediate the two positions of engagement.

The arrangement of the parts just described is such that engagement of the teeth of gear wheel 119 with the internal teeth 118 provides "direct" driving connection between shaft 15 and shaft 18 so that power may be transmitted between the two shafts without change of speed. In the intermediate position of gear wheel 119, as seen in Figure 1, shafts 15 and 18 are disconnected and the transmission as a whole is in "neutral." When gear wheel 119 is moved in the opposite direction so that its teeth engage the teeth of gear wheel 114, power is transmitted from shaft 15 through gear wheels 119 and 114 to shaft 112, and thence through gear wheels 115 and the external teeth 117 of gear wheel 116 to shaft 18. The size of the several gear wheels in this train are so adjusted as to transmit power upon a speed-increase basis, so that shaft 18 revolves at a higher rate of speed than shaft 15.

In order, if desired, to provide a "reverse," the mechanism is as follows: Upon a revolvable side shaft 121, suitably journaled in walls 68 and a fixed journal bearing 122, is secured for rotation therewith a gear wheel 123. The side shaft 121 is movable axially along a path defined by its bearings for a limited distance. Secured upon shaft 121 is a gear wheel 124 having upon its extended hub portion a circumferential groove 125. Gear wheel 124 is secured upon shaft 121 and rotates therewith. Upon shaft 15 is secured gear wheel 126 whose teeth are adapted to be engaged by the gear wheel 124 upon manual movement of the latter from the position shown in Figure 1. Internally toothed gear wheel 127 having internal teeth 128 is secured upon shaft 18. The internal teeth 128 of gear wheel 127 are adapted to be engaged by the teeth of gear wheel 123 when the latter is manually moved from the position shown. A yoke or other suitable actuating mechanism (not shown) engaged within the groove 125 provides the means by which shaft 121 may be moved axially within its bearings, thereby to move gear wheels 123 and 124 to the left as seen in Figure 1. When so actuated, and when the teeth of gear wheels 124 and 126 have been brought into engagement, and the teeth of gear wheel 123 have been brought into engagement with the internal teeth 128 of gear wheel 127, power will be transmitted between shaft 15 and shaft 18 in a reverse direction.

The operation of the apparatus so far described is as follows: Upon increase of the speed of rotation of driving shaft 11 above that speed which corresponds to the usual idling speed of an internal combustion motor, weights 27, 28 move outwardly away from the axis of shaft 11 under the influence of centrifugal force and against the springs 33, 34. In consequence of the angular relation of diagonal bars 29, 30 to the direction of movement of the said weights, collar 32 (which rotates with shaft 11) is moved to the left as seen in Figure 1. Such a motion of collar 32 is communicated to actuating member 36 (which does not rotate) by the half collars 37, 38 so that actuating member 36 slides to the left to a similar extent. By reason of the engagement of the lower end of plunger 44 with the righthand end of slot 42, plunger 44 is rotated in clockwise direction thereby moving pivot 59 upwards as plunger 44 approaches a vertical or "dead center" position. Such upward movement of pivot 59 rotates bell crank lever 53 in a counter-clockwise direction about its pivot 55, and by reason of the engagement of bell crank lever 53 with cap 74 of plunger 73, the said plunger is moved to the left as seen in Figure 1 and thereby the unit consisting of gear wheel 79, hub 80 and clutch member 81 is moved to the left until the clutch 81, 85, 82 is brought into engagement. Upon such engagement being effected power is transmitted between shaft 11 and shaft 15 through the train of gears associated with fixed shaft 67, this train having a ratio corresponding to "low gear." Further movement of actuating member 36 to the left, in response to outward movement of the weights 27, 28, causes plunger 44 to pass its vertical or "dead center" position and to move rapidly in a clockwise direction with an accompanying "snap action" until the end of the plunger has moved to the opposite end of slot 42. In consequence of such movement bell crank lever 53 moves rapidly in a clockwise direction under the influence of spring 78 and power transmitting engagement of clutch 81, 85, 82 is released. Upon such release, the further movement of actuating member 36 to the left, as seen in Figure 1, causes the righthand end of the lower slot 43 to engage the outer end of the lower plunger 45 and to move said plunger in a counter-clockwise direction about its moving pivot 60. As said plunger approaches a vertical or "dead center" position, bell crank lever 54 is rotated in a clockwise direction thereby moving plunger 89 to the left and bringing into power transmitting engagement the clutch 95, 99, 96. When such engagement has been effected, power is then transmitted between shaft 11 and shaft 15 through the train of gears associated with fixed shaft 88, the ratio of the gear wheels in this train being equivalent to "intermediate gear." Still further movement of actuating member 36 to the left, as seen in Figure 1, moves plunger 45 past its vertical position, whereupon plunger 45 moves rapidly in a counter-clockwise direction under the influence of the spring within annular spring housing 58 with a resulting "snap action" which quickly moves bell crank lever 54 in a counter-clockwise direction to release the power-transmitting engagement of clutch 95, 99, 96. Still further movement of actuating member 36 brings the end face thereof into engagement with pin 104 and moves the said pin to the left as seen in Figure 1. Such movement transmitted through floating shaft 103 and pin 106, brings clutch elements 110, 111 into power-transmitting engagement so that power is then transmitted between shaft 11 and shaft 15 on a "direct" basis, that is, without speed reduction.

The means will now be described whereby the simple response of actuating member 36 to the speed of rotation of the driving shaft 11 may be modified automatically or manually, or both.

Figure 2:
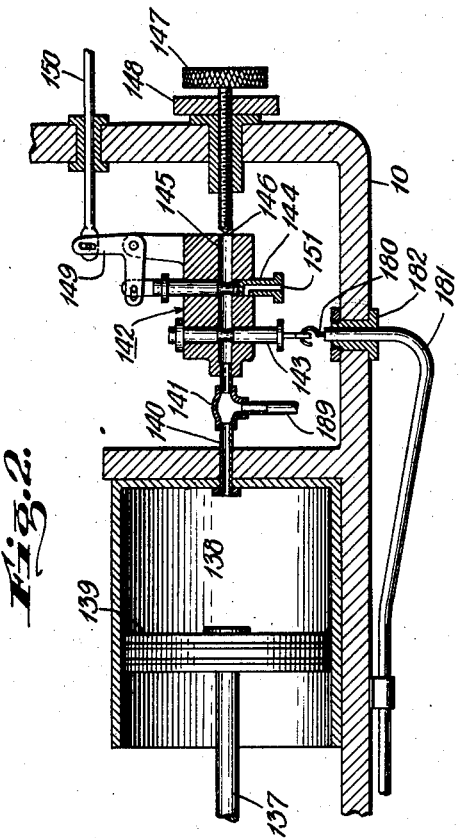
Figure 2 is a vertical section of the principal parts of, and immediately associated with, the oil valve mechanism 142 which appears in elevation at one corner of Figure 1.
Figure 3:
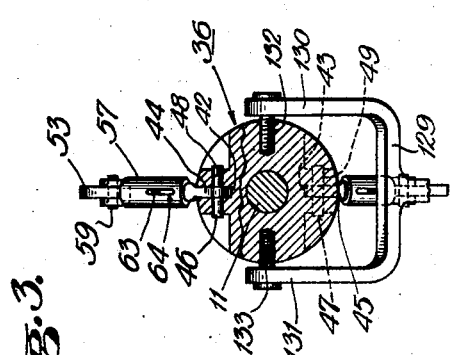
Figure 3 is a vertical section upon the line 3, 3 of Figure 1.

Secured to opposite sides of actuating member 36 is a yoke 129 (see Figs. 1 and 3). The ends 130, 131 of said yoke are provided with slots (shown in dotted lines in Fig. 1) engaging pins 132, 133 secured in opposite sides of the actuating member 36. Yoke 129 is pivoted upon a fixed pivot 134. At the lower end of yoke 129 is a slot 135 for engagement with a pin 136 secured in the end of a piston rod 137 entering an open-end cylinder 138 (see Fig. 2) and having secured thereon a piston head 139 operating within said cylinder. The said cylinder is intended to be submerged in a pool of oil at or near the bottom of the casing 10 and the cylinder and piston function as a dashpot or auxiliary control mechanism for the actuating member 36. An oil pipe 140 (see Fig. 2) interconnects the cylinder 138 with a T-joint 141, and one of the openings of the T-joint is connected with an oil valve mechanism indicated generally by the reference character 142 on Figure 1 and shown in more detail in Figure 2.

Oil valve mechanism 142 comprises two movable valve members 143, 144 having control portions of reduced diameter to permit oil to flow in a central bore 145. Central bore 145 has an orifice 146 communicating with the pool of oil in the bottom of casing 10. An adjustable thumb screw 147, having a locking nut 148, is adapted to be adjusted toward or from the opening 146 in order to restrict more or less, as desired, the flow of oil in or out of the orifice 146.

In ordinary operation both of valve members 143 and 144 remain in the position shown in Figure 2 in which the reduced center portions thereof are in alinement with the central bore 145, so that oil may freely flow from end to end through said bore 145. Valve member 144 is adapted for manual operation, either to raise or to lower it, by means of the bell crank lever 149 and the operating rod 150. Valve member 144 has an internal drilling 151 so arranged and adapted that, when valve member 144 is raised from the position shown in Figure 2 and internal drilling 151 is brought into register with the central bore 145, oil may pass freely between cylinder 138 and the pool of oil in casing 10 through bore 145 and drilling 151 without restraint and without passing through restricted orifice 146. On the other hand, when valve member 144 is moved downwardly from the position shown in Figure 2, until the portion of restricted diameter is entirely below the central bore 145, the arrangement of the parts is such that flow of oil between cylinder 138 and the pool of oil within casing 10 is altogether prevented, and piston 139 is secured against any movement and, in consequence, through the yoke 129, actuating member 36 is secured against any movement from the position which it then occupies.

Valve member 143 is automatically controlled according to an increase of load upon the driven shaft for a purpose hereinafter described. Said valve member 143 is adapted, when moved upwardly by the mechanism hereafter described to an extent sufficient to move its center portion of reduced diameter clear of the central bore 145, to prevent further flow of the oil between the cylinder 138 and the pool of oil within the casing 10 irrespective of the then position of valve member 144. While valve member 143 is thus in position to close passage 145, oil is forced under pressure through oil pipe 189 (from a source hereafter described) into T-joint 141 and thence into cylinder 138. The purpose of closing valve 143 is to prevent the oil last mentioned from escaping into the oil pool in casing 10, and to cause the same to pass into cylinder 138.

The means will now be described whereby movement of piston 139 within oil cylinder 138 may be automatically modified in accordance with increase or decrease of load upon the driven shaft. This means is herein referred to as the "torque reaction unit."

To the rearward (left as seen in Fig. 1) end of shaft 18 is secured a collar 152 for rotation therewith. Collar 152 is provided with a recess 153 in its outer periphery for engagement with the bearing 19 secured to casing 10. Collar 152 is provided with a rearwardly projecting annular rim 154 having its end face formed in a series of angular faces 155 (see Fig. 8). Partly within annular rim 154 is positioned a torque reaction member 156 provided with four longitudinal arcuate slots 157, 158, 159 and 160 (see Fig. 9). Said slots pass entirely through the torque reaction member 156 but approximately at their mid-points are reduced in size to provide spring seats 161. Bolts 162, 163, 164 and 165 threadedly engage collar 152 and extend through said slots 157, 158, 159 and 160 respectively. Coil springs 166, 167, 168, 169, arranged around each of these bolts, respectively, are seated upon spring seats 161, and are secured in place and under substantially heavy compression by nuts 170. Torque reaction member 156 is provided with a shoulder having an angularly formed face 171 (see Fig. 8) corresponding to and matching the angularly formed end faces 155 when the parts are in their normal position.

Torque reaction member 156 has internal splines 172 (see Figs. 1 and 9) for the attachment of the ultimate shaft to be driven (not shown). Torque reaction member 156 is adapted at all times to rotate with the said shaft to be driven but is arranged to slide lengthwise thereof under certain conditions. The cooperating angularly inclined faces 155 and 171 are so arranged that normally, and under ordinary operating conditions, the torque reaction member 156 is maintained in seated engagement with annular rim 154 of collar 152, but in the event of any sudden increase of load or of any unusual sudden strain tending to cause collar 152 and torque reaction member 156 to rotate relative to each other in either direction, such rotation will cause one of angularly formed faces 155 and 171 to slide upon the other resulting in movement of torque reaction member 156 away from collar 152. Such movement is opposed by the compression of springs 166, 167, 168, 169, tending to return the torque reaction member 156 to its original position. As the force producing this separation diminishes, torque reaction member 156 will be returned to its original position in seated engagement with annular rim 154 by reason of the energy stored in said springs. Thus, any undue strain or extra load upon the driven shaft will cause a rearward movement of torque reaction member 156. This rearward movement is utilized, in the present invention, to modify the movement of actuating member 36 in such manner as to cause the transmission as a whole to remain in "low gear" longer than it otherwise would, or to cause the transmission to shift to a higher gear ratio in order that the motor may rotate at higher speed during the time it is supplying power to overcome the load which caused such rearward movement of the torque reaction member 156.

Upon the outer periphery of torque reaction member 156 is a circular channel 173. Engaged therewith are fingers 174 of a yoke 175 pivotally mounted on a fixed bracket 176 and integral with a downwardly extending lever arm 177. Pivotally secured to the lower end of lever arm 177 is a push rod 178 passing through an oil-tight packing 179. Secured to the opposite end of said push rod within an oil-tight chamber 179a is a cable 180 enclosed within a suitable cover 181. The opposite end of said cover 181 enters casing 10 through an oil-tight packing 182 and the opposite end of cable 180, thus introduced into the casing 10, is attached to an eye at the lower end of movable valve member 143 hereinabove described.

Intermediate the fulcrum and lower end of lever arm 177 is a pin 183 secured to said lever arm. Connecting rod 184 having therein a longitudinal slot 185 of required length (for a purpose explained below) is pivotally secured to the end of a piston rod 186, and pin 183 is engaged within the slot 185. Piston rod 186 passes through a suitable oil-tight packing and upon the opposite end thereof is secured a piston head 187 operating within an open-end cylinder 188 having an inlet 190 through which the cylinder may be initially charged with oil, and which is thereafter preferably kept closed. An oil pipe 189 interconnects cylinder 188 with T-joint 141.

The arrangement of the lever arm 177 is such that upon movement thereof about its fulcrum in a counterclockwise direction, as seen in Figure 1, cable 180 will first be actuated to close valve member 143, and thereafter (when pin 183 has traveled the length of slot 185) piston 187 will be moved to discharge oil from cylinder 188 into the T-joint 141 and thus into cylinder 138. Such discharge of oil will either prevent piston head 139 from moving to the right (as seen in Fig. 2) in cylinder 138, or it will move the said piston to the left in said cylinder. The arrangement and operation of the parts is such that if some unusual or heavy load is imposed upon the driven shaft, torque reaction member 156 is moved to the left, as seen in Figure 1, and in consequence through the mechanism described, oil is forced under pressure into cylinder 138. The effect is to check or prevent movement of actuating member 36 to the left or in extreme cases to move it to the right as seen in Figure 1—i. e., the force of such oil is in a direction tending to move the actuating mechanism in a direction to shift the gear from a lower to a higher ratio of speed reduction and thereby either to maintain the transmission as a whole in, for example, "low gear" while the speed of rotation of the engine in overcoming said load increases above the predetermined speed at which shift would normally occur to "intermediate gear" or, in extreme cases, to effect a shift from "direct" to "intermediate" or from "intermediate" to "low" in order to enable the engine to produce the power required to overcome said load at higher speeds of rotation.

The restricted orifice 146, which is operative to restrict to any desired extent the free flow of oil between cylinder 138 and the pool of oil in the bottom of casing 10 when valve members 143, 144 are in their open positions as shown in Figure 2, enables cylinder 138 and its piston to serve as a dashpot for checking too rapid movements of actuating member 36. When, however, the operator desires to secure actuating member 36 in any desired position in which it may then be— as, for example, if it is desired to remain in "high" or in some other gear ratio notwithstanding a contemplated increase or decrease in the motor speed which would shift to some other ratio—the operator actuates the manual controls to move valve member 144 downwardly (as seen in Fig. 2). When valve member 144 is thus closed, no oil can pass through restricted orifice 146 and the existing gear ratio is maintained till valve member 144 is opened. When, per contra, the operator desires to hasten the response of actuating member 36 to increase or decrease in the motor speed—i. e., to short-circuit the restricted orifice 146—he actuates the manual controls to move valve member 144 upwardly, thus allowing oil to pass freely through the internal drilling 151. Thus shifts of gear ratio may be brought about more quickly.

It will be understood that the form of device used herein for specific illustration of the invention does not exhaust the possibilities of variation therein and that all such equivalent structures as are defined in the annexed claims are, and are intended to be, included within the scope of this invention regardless of differences in shape, form or instrumentalities.

I claim:

1. In a device for transmitting power, in combination, driving and driven shafts, a clutch, a spring opposing actuation of said clutch, speed reduction apparatus interposable between said shafts upon actuation of said clutch, a lever adapted upon rotation about its fulcrum to actuate said clutch and to compress said spring, a compression member pivotally secured to said lever at a point removed from the fulcrum thereof, and an actuator engaging the free end of said member and movable in a rectilinear path adapted on preliminary traverse in either direction to rotate said lever through said compression member in a direction tending progressively to actuate said clutch and to compress said spring and, on further traverse in the same direction, to release said lever substantially instantaneously for rotation under the influence of said spring to permit said clutch to disengage.

2. The combination recited in claim 1, including means to move said actuator along its said path of movement in response to increase in the speed of rotation of one of said shafts.

3. The combination recited in claim 1, including means to move said actuator along its said path of movement in response to increase in the speed of rotation of the driving shaft.

4. The combination recited in claim 1, including means to move said actuator along its said path of movement in response to increase in the speed of rotation of the driving shaft, and means responsive to increase of load upon the driven shaft tending to oppose movement of said actuator in said direction when the load upon the driven shaft has increased above a predetermined amount.

5. The combination recited in claim 1, including means to move said actuator along its said path of movement in response to increase in the speed of rotation of the driving shaft, and manually operated means selectively operable at will to check the said movement of said actuator.

6. The combination recited in claim 1, including means to move said actuator along its said path of movement in response to increase in the speed of rotation of the driving shaft, and means including a fluid dashpot and a restricted orifice to check rapid movement in either direction of said actuator.

7. The combination recited in claim 1, including means to move said actuator along its said path of movement in response to increase in the speed of rotation of the driving shaft, and means including a fluid-filled cylinder and a piston movable therein for moving said actuator in the opposite direction when the load upon the driven shaft has increased above a predetermined amount.

8. In a transmission between an engine and a shaft to be driven thereby, the combination of a first clutch adapted, upon actuation, to interconnect the engine and driven shaft through speed reduction gears, a compression member for the actuation of such clutch, a movable actuator, one end of said compression member being pivotally mounted upon a lever at a point removed from the fulcrum thereof, the other end of said compression member being secured to said actuator for sliding movement within a limited path along the same, a second clutch adapted, upon actuation, to interconnect the engine and driven shaft in direct power-transmitting engagement, and means engageable by the actuator for actuation of said second clutch, the said mechanism being so arranged and related that movement of said actuator from its initial position actuates said compression member, further movement thereof releases said compression member, and still further movement thereof approaching its extreme position brings said actuator into engagement with the means for actuating said second clutch.

9. The combination recited in claim 8, including resilient means to disengage said second clutch upon return movement of the actuator from its extreme position.

10. The combination recited in claim 8, including centrifugal means responsive to increase in speed of rotation of the engine interconnected with said actuator and adapted, upon increase of such speed, to move said actuator from its initial position towards its extreme position.

11. The combination recited in claim 8, including means responsive to increase of load upon the driven shaft tending to cause movement of said actuator from its extreme position towards its initial position when the load upon the driven shaft has increased above a predetermined amount.

12. In speed change apparatus including a clutch and a constant mesh train of gears interposed between a driving shaft and a driven shaft by the engagement of said clutch, in combination, a compression member for the actuation of a said clutch and a movable actuator for said compression member, one end of said compression member being pivotally mounted upon a lever at a point removed from the fulcrum thereof, the other end of said compression member being secured within a slot in said actuator and slidable therein between the ends of said slot, the said mechanism being so arranged and adapted as to progressively actuate a clutch upon preliminary movement of said actuator in either direction and to release said clutch substantially instantaneously upon further movement of said actuator in the same direction.

13. In speed change apparatus including a clutch adapted to be interposed between an engine and a shaft to be driven thereby, in combination, a compression member for the actuation of said clutch and a movable actuator for said compression member, one end of said compression member being pivotally mounted upon a lever at a point removed from the fulcrum thereof, the other end of said compression member being secured within a slot in said actuator and slidable therein between the ends of said slot, the said mechanism being so arranged and adapted as to progressively actuate a clutch upon preliminary movement of said actuator in either direction and to release said clutch substantially instantaneously upon further movement of said actuator in the same direction, and centrifugal means responsive to increase in speed of rotation of the engine interconnected with said actuator and adapted to move the same in a direction to actuate said compression member as the speed of rotation of said engine increases above a predetermined speed.

14. In speed change apparatus including a clutch adapted to be interposed between an engine and a shaft to be driven thereby, in combination, a compression member for the actuation of said clutch and a movable actuator for said compression member, one end of said compression member being pivotally mounted upon a lever at a point removed from the fulcrum thereof, the other end of said compression member being secured within a slot in said actuator and slidable therein between the ends of said slot, the said mechanism being so arranged and adapted as to progressively actuate a clutch upon preliminary movement of said actuator in either direction and to release said clutch substantially instantaneously upon further movement of said actuator in the same direction, centrifugal means responsive to increase in speed of rotation of the engine interconnected with said actuator and adapted to move the same in a direction to actuate said compression member as the speed of rotation of said engine increases above a predetermined speed, and means responsive to increase of load upon the driven shaft tending to oppose said movement of said actuator when the load upon the driven shaft has increased above a predetermined amount.

15. In a device for transmitting power between driving and driven shafts, the combination of a clutch, speed reduction apparatus interposable between said shafts upon engagement of said clutch, a spring opposing engagement of said clutch, a pivoted member fulcrumed on a fixed pivot and adapted upon rotation on its pivot to cause said clutch to engage and to compress said spring, and means responsive to increase in the speed of rotation of one of said shafts adapted to rotate said member on its pivot in a direction tending to cause said clutch progressively and gradually to engage and, when the speed of rotation of said shaft increases above a predetermined speed, to release said member for rotation under the influence of said spring in a direction tending to permit said clutch to disengage substantially instantaneously.

16. In speed change apparatus containing a clutch, in combination, a pivoted member adapted when rotated upon its pivot to actuate said clutch, a spring opposing such actuation, an actuator movable in a rectilinear path in response to increase in the speed of rotation of one of said shafts, and a compression member interconnecting said pivoted member and said actuator, the arrangement being such that preliminary movement of said actuator in one direction causes said pivoted member to rotate upon its pivot in a direction to actuate said clutch gradually and to compress said spring progressively, and further movement of said actuator in the same direction permits said pivoted member to rotate in the opposite direction under the influence of said spring to release said clutch substantially instantaneously.

17. In a device for transmitting power between a driving and a driven shaft, the combination of a clutch, speed reduction apparatus interposable between said shafts upon engagement of said clutch, a push rod movable in one direction to cause said clutch to engage and in the other direction to permit said clutch to disengage, a spring opposing movement of said rod in said first-mentioned direction, a pivoted member fulcrumed upon a fixed pivot and having a portion thereof adapted to engage with said push rod and to move the same in a direction to cause said clutch to engage, means responsive to increase in the speed of rotation of one of said shafts adapted to rotate said member upon its pivot in a direction tending to bring said member into engagement with said push rod and to move said rod gradually in a direction to cause said clutch to engage progressively and, when the speed of rotation of said shaft increases above a predetermined speed, to release said member and to permit the same to rotate upon its pivot under the influence of said spring in a direction permitting said clutch to disengage substantially instantaneously.

18. In a device for transmitting power between a driving and a driven shaft, the combination of a clutch, speed reduction apparatus interposable between said shafts upon engagement of said clutch, a push rod movable in one direction to cause said clutch to engage and in the other direction to permit said clutch to disengage, a spring opposing movement of said rod in said first-mentioned direction, a pivoted member fulcrumed upon a fixed pivot and having a portion thereof adapted to engage with said push rod and to move the same in a direction to cause said clutch to engage, a compression member pivotally secured to said pivoted member, and an actuator movable in a predetetrmined path in response to increase in the speed of rotation of one of said shafts adapted on preliminary movement to engage with said compression member and thereby to rotate said pivoted member gradually upon its pivot and to actuate said clutch progressively and, on further movement in the same direction, to release said pivoted member and to permit the same to rotate on its pivot under the influence of said spring in a direction permitting said clutch to disengage substantially instantaneously.

19. In speed change mechanism including a set of constantly meshed gears interposed between a driving shaft and a shaft driven thereby, in combination, a clutch, a spring arranged to oppose engagement of said clutch, a thrust member for forcing said clutch into engagement, an actuator arranged for motion in a predetermined path, means responsive to increased speed of the driving shaft tending to cause movement of the actuator in one direction along said path, means responsive to increase of load upon the driven shaft tending to cause movement of the actuator in the reverse direction along said path, and a linkage between said actuator and said thrust member so arranged that progressive movement of the actuator in either direction along its path will first cause progressive engagement of the clutch in opposition to the said spring until at a predetermined position of the actuator the clutch is fully engaged, and further movement of the actuator in the same direction beyond said position will substantially instantaneously release said spring whereby said clutch will be disengaged.

20. In speed change mechanism including a plurality of sets of constantly meshed gears interposed between a driving shaft and a shaft driven thereby, in combination, a plurality of clutches, each adapted on engagement to cause transmission of power through one of said sets of gears, a spring associated with each of said clutches to oppose engagement of said clutch, thrust members for selectively forcing said clutches into engagement, an actuator arranged for motion in a predetermined path, means responsive to changes in speed of the driving shaft tending to cause movement of the actuator along said path, and linkages between said actuator and said thrust members so arranged that progressive movement of the actuator in either direction along its path will first cause progressive engagement of one of said clutches in opposition to its spring until at a predetermined position of the actuator said clutch is fully engaged and further movement of the actuator in the same direction beyond said position will substantially instantaneously release said spring thereby disengaging said clutch and will thereafter cause progressive engagement of another of said clutches.

WILLIAM C. BRADEN.